United States Patent Office.

JAMES THAME, OF LONDON, ENGLAND, ASSIGNOR TO SOUTH WESTERN RUBBER COMPANY, LIMITED, OF LONDON, ENGLAND.

TREATMENT OF CRUDE RUBBER.

SPECIFICATION forming part of Letters Patent No. 707,654, dated August 26, 1902.

Application filed December 3, 1901. Serial No. 84,525. (Specimens.)

*To all whom it may concern:*

Be it known that I, JAMES THAME, residing at London, England, a subject of the King of Great Britain and Ireland, have invented a new and useful Improvement in and Relating to the Treating of Crude Rubber, (for which I have made or caused to be made applications for Letters Patent in Great Britain under No. 9,920, May 13, 1901; in Belgium, No. 126,346, October 2, 1901, and in France, No. 304,455, November 9, 1901,) of which the following is a specification.

This invention relates to the treatment of crude rubber, and has for its object the provision of a method and means to overcome the difficulties at present existent with crude rubber as to the removal of oxidized gum, putrid matter, dirt, and other objectionable matter from the gum in order to render it capable for use in the arts.

In the methods at present used great difficulty is experienced in freeing the rubber from these impurities, and most of the rubber after treatment contains a large percentage of deleterious matter, which reduces its value as a commercial product. These conditions obtain very largely, in particular, as to the rubber imported from West Africa and some parts of Central America, and often to so great an extent as to render such rubber useless for the manufacture of goods of a high quality. This invention entirely overcomes these difficulties and renders any dirty, putrid, or oxidized crude gum in such a condition as to favorably compare with the best sample of high-class gum now used for the manufacture of articles of a good quality.

To carry this invention into effect, I first soak the rubber in a solution of potassium or sodium hydrate of a strength from two per cent. to ten per cent. and at a temperature from 80° to 100° centigrade and remove the dirt and oxidized gum adhering to the external surfaces of the lumps. The rubber is then sliced up and laid on open grids, say, of wirework, which are then placed in a tank, which is subsequently closed. Carbon tetrachlorid, ($C Cl_4$,) carbon trichlorid, ($C_2Cl_6$,) carbon dichlorid, ($C_2 Cl_4$,) carbon disulfied, ($CS_2$,) or other equivalent carbon compound, either plain or in solution with alcohol, or a combination of any of the above is then placed or run into the tank, so as to completely cover the sliced rubber on the grids. The rubber is allowed to take up such a quantity of the chemical as is predetermined by experiment to be necessary, after which the chemical is run off and the tank filled up with water or other inert liquid of less specific gravity than the solvent. The action of the chemical is allowed to go on for a period of from eighteen to twenty-four hours. At the expiration of this time the gum is in a soft condition, and the putrid matter originally contained in its interstices is dissolved out. The water is then run out and a fresh charge of water is added and raised to 100° centigrade by steam injection, or water at a temperature of 100° centigrade may be run through the tank in a stream from one-half to three hours, by means of which the gum is opened out and any mechanically-held dirt is washed away and any residual chemical driven off. I find in certain rubber that impurities, such as fine wood-dust and the like, mixed mechanically with the gum can be more perfectly removed by passing heated gaseous fluid, such as live steam, through the mass while held in position between perforated supports, so that the stream has to pass through the body of spongy rubber in passing from one side of the mass to the other. This operation can be effected in the soaking tank or chamber after the washing with hot water has been carried out. By these means the impurities are carried out of the body of the material by the steam acting as a vehicle therefrom. The rubber is then taken out of the tank and passed through heated rolls to consolidate it, or equivalently it may be pressed into blocks, after which it is placed in a dark room and kept at a temperature of from 60° to 70° Fahrenheit to dry and finish.

I do not confine myself to the particular carbon compounds described, as I can use any other material which is a solvent of the matters to be removed from the surface of the rubber.

Having now described my invention, what I claim, and desire to secure by Letters Patent, is—

1. A process of treatment of crude rubber consisting of the soaking of the rubber in a hot alkaline solution to remove deleterious matter from the exterior thereof, the submergence of the rubber in small pieces in a solvent of the matter to be removed, so that the interstices of the rubber are in contact with the said solvent, the subsequent submergence of the solvent-charged rubber in water or other inert liquid of less specific gravity than the solvent for such time as will allow the solvent to act upon the internal surfaces, and the removal of the dissolved matter and any residual free solvent by washing, substantially as described.

2. A process of treatment of crude rubber to remove deleterious matter therefrom, consisting of the supporting of the rubber in small pieces within a closed space, the submergence of the said rubber in a solvent of the said deleterious matter within the closed space, so that the surfaces of the interstices of the material are in contact with the solvent, the subsequent submergence of the solvent-charged rubber in water or other inert liquid of less specific gravity than the solvent for such a time as will allow the solvent to act upon the internal surfaces and the removal of the dissolved matter and any residual free solvent by washing, substantially as described.

In witness whereof I have hereunto set my hand in presence of two witnesses.

JAMES THAME.

Witnesses:
FREDERICK THOMAS MEEK,
LINDSAY RALFS CASEY.